United States Patent
Hasegawa

(10) Patent No.: US 12,471,945 B2
(45) Date of Patent: Nov. 18, 2025

(54) CONTROL DEVICE, ULTRASONIC TREATMENT SYSTEM, AND RESONANCE FREQUENCY SEARCHING METHOD

(71) Applicant: OLYMPUS CORPORATION, Tokyo (JP)

(72) Inventor: Shogo Hasegawa, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 1099 days.

(21) Appl. No.: 17/472,201

(22) Filed: Sep. 10, 2021

(65) Prior Publication Data
US 2022/0000514 A1 Jan. 6, 2022

Related U.S. Application Data

(63) Continuation of application No. PCT/JP2019/010717, filed on Mar. 14, 2019.

(51) Int. Cl.
*A61B 17/32* (2006.01)
*G01N 29/12* (2006.01)

(52) U.S. Cl.
CPC ..... *A61B 17/320068* (2013.01); *G01N 29/12* (2013.01); *A61B 2017/320094* (2017.08)

(58) Field of Classification Search
CPC .... A61B 17/320068; A61B 2017/0015; G01N 29/12
See application file for complete search history.

(56) References Cited

U.S. PATENT DOCUMENTS

| | | | | |
|---|---|---|---|---|
| 2007/0241711 A1* | 10/2007 | Finamore | ............... | G11B 5/596 |
| | | | | 318/632 |
| 2008/0074718 A1* | 3/2008 | Bush | ................... | G02B 26/105 |
| | | | | 359/197.1 |
| 2009/0259423 A1 | 10/2009 | Shimizu | | |
| 2011/0241786 A1* | 10/2011 | Gilbert | ........... | A61B 17/320092 |
| | | | | 331/34 |
| 2013/0167643 A1* | 7/2013 | Nizza | .................... | G01H 11/00 |
| | | | | 73/579 |

(Continued)

FOREIGN PATENT DOCUMENTS

| | | |
|---|---|---|
| JP | 2005-245156 A | 9/2005 |
| JP | 2005-341811 A | 12/2005 |
| JP | 2009-261935 A | 11/2009 |

OTHER PUBLICATIONS

Jun. 11, 2019 Search Report issued in International Patent Application No. PCT/JP2019/010717.

*Primary Examiner* — Erin Mcgrath
(74) *Attorney, Agent, or Firm* — Oliff PLC

(57) ABSTRACT

A control device includes: an energy source configured to supply an input combined signal having a plurality of frequency components to an ultrasound transducer; a detector configured to detect an output combined signal resulting from a change of the input combined signal by a frequency response of the ultrasound transducer, and output a detected signal according to the output combined signal; and a processor configured to separate the detected signal into a plurality of frequency components; and based on the plurality of frequency components that have been separated, determine whether or not to perform a scan, and determine a resonance frequency of the ultrasound transducer.

20 Claims, 14 Drawing Sheets

(56) References Cited

U.S. PATENT DOCUMENTS

2014/0058293 A1\* 2/2014 Hynynen ............... A61B 8/085
 601/2
2014/0190238 A1\* 7/2014 Mcanally ............... G01N 9/002
 73/30.01

\* cited by examiner

CONTROL DEVICE, ULTRASONIC TREATMENT SYSTEM, AND RESONANCE FREQUENCY SEARCHING METHOD

CROSS-REFERENCE TO RELATED APPLICATION

This application is a continuation of International Application No. PCT/JP2019/010717, filed on Mar. 14, 2019, the entire contents of which are incorporated herein by reference.

BACKGROUND

1. Technical Field

The present disclosure relates to a control device, an ultrasonic treatment system, and a resonance frequency searching method.

2. Related Art

In the related art, an ultrasonic treatment system for treating a living tissue by applying ultrasound vibration to the living tissue includes: an ultrasound transducer that generates the ultrasound vibration according to a drive signal supplied; and a control device that supplies the drive signal to the ultrasound transducer.

The control device sweeps the frequency (hereinafter, referred to as the drive frequency) of the drive signal to be supplied to the ultrasound transducer over a certain range to search for a resonance frequency of the ultrasound transducer. Thereafter, the control device executes phase locked loop (PLL) control to lock the drive frequency to the resonance frequency acquired by the searching.

SUMMARY

In some embodiments, a control device includes: an energy source configured to supply an input combined signal having a plurality of frequency components to an ultrasound transducer; a detector configured to detect an output combined signal resulting from a change of the input combined signal by a frequency response of the ultrasound transducer, and output a detected signal according to the output combined signal; a processor configured to separate the detected signal into a plurality of frequency components; and based on the plurality of frequency components that have been separated, determine whether or not to perform a scan, and determine a resonance frequency of the ultrasound transducer.

In some embodiments, an ultrasonic treatment system includes: an ultrasound transducer configured to generate ultrasound vibration to treat a living tissue; and a control device configured to control operation of the ultrasound transducer. The control device may include an energy source, a detector, and a processor as described above.

In some embodiments, a resonance frequency searching method includes: generating an input combined signal having a plurality of frequency components; supplying the input combined signal to an ultrasound transducer; detecting an output combined signal resulting from a change of the input combined signal by a frequency response of the ultrasound transducer; outputting a detected signal according to the output combined signal; separating the detected signal into a plurality of frequency components; determining, based on the plurality of frequency components separated from the detected signal, whether or not to perform a scan; and determining a resonance frequency of the ultrasound transducer.

The above and other features, advantages and technical and industrial significance of this disclosure will be better understood by reading the following detailed description of presently preferred embodiments of the disclosure, when considered in connection with the accompanying drawings.

DETAILED DESCRIPTION

Modes for implementing the disclosure (hereinafter, embodiments) will be described below while reference is made to the drawings. The disclosure is not limited by the embodiments described below. Furthermore, any portions that are the same will be assigned with the same reference sign, throughout the drawings.

Schematic Configuration of Ultrasonic Treatment System

Figure 1:
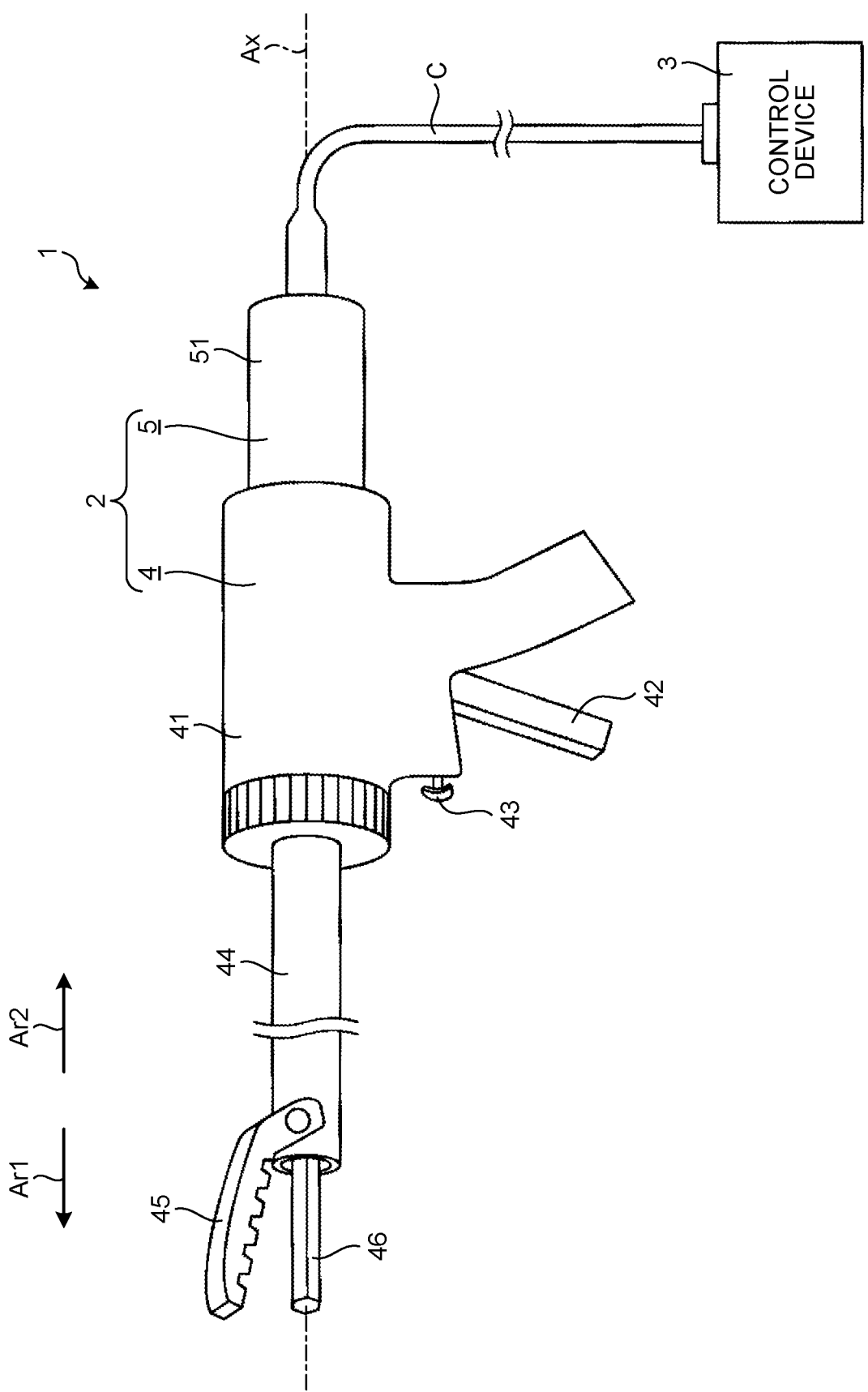
FIG. 1 is a diagram illustrating an ultrasonic treatment system according to an exemplary embodiment.

FIG. 1 is a diagram illustrating an ultrasonic treatment system 1 according to an exemplary embodiment.

The ultrasonic treatment system 1 is for applying ultrasound energy to a part (hereinafter, referred to as a target part) to be treated in a living tissue to perform treatment of the target part. This treatment means, for example, coagulation and incision of the target part. The ultrasonic treatment system 1 includes, as illustrated in FIG. 1, a treatment tool 2 and a control device 3.

Configuration of Treatment Tool

Figure 2:
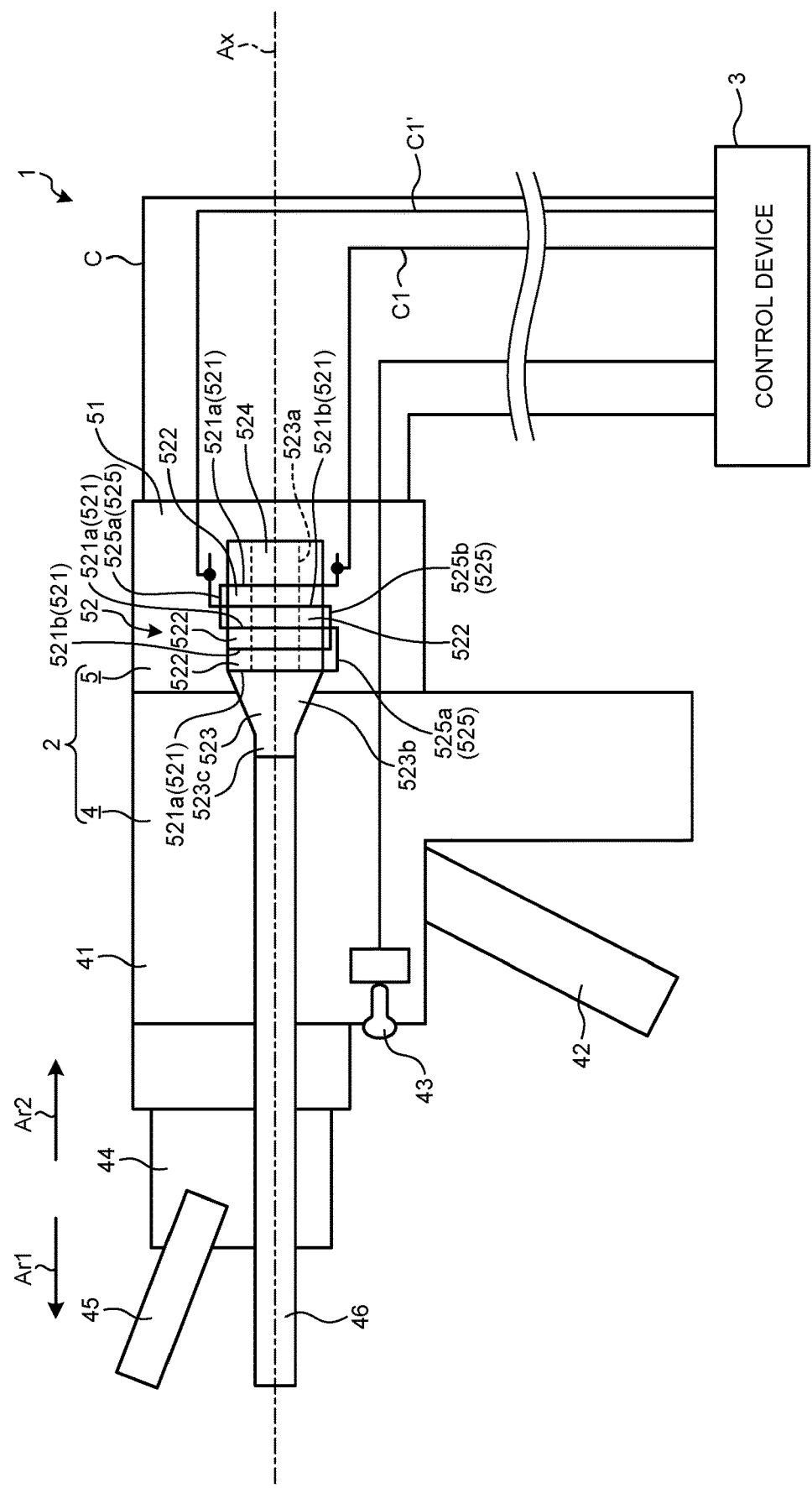
FIG. 2 is a diagram illustrating a configuration inside a treatment tool.

FIG. 2 is a diagram illustrating a configuration inside the treatment tool 2.

The treatment tool 2 is, for example, a surgical medical treatment tool for treating a target part in a state where the surgical medical treatment tool has penetrated an abdominal wall. This treatment tool 2 includes, as illustrated in FIG. 1 or FIG. 2, a handpiece 4 and an ultrasound transducer unit 5.

The handpiece 4 includes, as illustrated in FIG. 1 or FIG. 2, a holding case 41, an operating knob 42, a switch 43, a sheath 44, a jaw 45, and a vibration transmitting member 46.

The holding case 41 supports the whole treatment tool 2.

The operating knob 42 is movably attached to the holding case 41 and receives opening and closing operation by an operator.

The switch 43 is provided in a state of being exposed to the exterior of the holding case 41 and receives operation to start output from the operator. The switch 43 outputs an operation signal corresponding to the operation to start output, via an electric cable C (FIG. 1 or FIG. 2), to the control device 3.

The sheath 44 has a cylindrical shape. The central axis of the sheath 44 will hereinafter be referred to as the central axis Ax (FIG. 1 or FIG. 2). Furthermore, one direction along the central axis Ax will hereinafter be referred to as a distal direction Ar1 (FIG. 1 or FIG. 2) and the other direction along the central axis Ax will hereinafter be referred to as a proximal direction Ar2 (FIG. 1 or FIG. 2). A part of the sheath 44 is attached to the holding case 41, the part being in the proximal direction Ar2.

The jaw 45 is rotatably attached to an end portion of the sheath 44, the end portion being in the distal direction Ar1, and holds a target part between the jaw 45 and an end portion of the vibration transmitting member 46, the end portion being in the distal direction Ar1. The holding case 41 and sheath 44 mentioned above have an opening and closing unit (not illustrated in the drawings) provided inside the holding case 41 and sheath 44. The opening and closing unit turns the jaw 45 away from or to the end portion of the vibration transmitting member 46, the end portion being in the distal direction Ar1, according to the opening and closing operation on the operating knob 42 by the operator.

The vibration transmitting member 46 has a long shape extending linearly along the central axis Ax and as illustrated in FIG. 1 or FIG. 2, is inserted through the sheath 44 in a state where the vibration transmitting member 46's end portion has been exposed to the exterior, the vibration transmitting member 46's end portion being in the distal direction Ar1. Furthermore, an end portion of the vibration transmitting member 46 is connected to a bolt-clamped Langevin-type transducer (BLT) 52 (FIG. 2) that forms the ultrasound transducer unit 5, the end portion being in the proximal direction Ar2. The vibration transmitting member 46 transmits ultrasound vibration generated by the BLT 52 from the vibration transmitting member 46's end portion that is in the proximal direction Ar2, to the vibration transmitting member 46's end portion that is in the distal direction Ar1. In this embodiment, the ultrasound vibration is longitudinal vibration that is vibration along the central axis Ax. A part of the vibration transmitting member 46 vibrates at an amplitude of 80 μm, for example, due to the longitudinal vibration of the vibration transmitting member 46, the part being in the distal direction Ar1. That is, ultrasound vibration is applied to a target part held between the jaw 45 and the end portion of the vibration transmitting member 46, the end portion being in the distal direction Ar1, from that end portion. In other words, ultrasound energy is applied to the target part from the end portion in the distal direction Ar1. Frictional heat is thereby generated between the end portion in the distal direction Ar1 and the target part. The target part is then treated.

The ultrasound transducer unit 5 includes, as illustrated in FIG. 1 or FIG. 2, a TD case 51 and the BLT 52 (FIG. 2).

The TD case 51 supports the BLT 52 and is detachably connected to the holding case 41.

The BLT 52 corresponds to an ultrasound transducer. The BLT 52 generates ultrasound vibration, under control of the control device 3. This BLT 52 includes, as illustrated in FIG. 2, plural electrode plates 521, plural piezoelectric elements 522, a front mass 523, and electric wiring 525.

The plural electrode plates 521 are a part to which a drive signal from the control device 3 is supplied. In the example in FIG. 2, five electrode plates 521 are illustrated. The plural electrode plates 521 each have a disk shape with an opening in the center and are provided on one another along the central axis Ax. Furthermore, the plural electrode plates 521 include negative electrode plates 521a and positive electrode plates 521b that are alternately provided along the central axis Ax.

The plural piezoelectric elements 522 each have a disk shape with an opening in the center and are each provided between the negative electrode plate 521a and the positive electrode plate 521b. That is, the plural electrode plates 521 and the plural piezoelectric elements 522 are alternately provided along the central axis Ax. In the example of FIG. 2, four piezoelectric elements 522 are illustrated. By generation of potential difference in a thickness direction of the plural piezoelectric elements 522 according to a drive signal supplied to the plural electrode plates 521, the thickness direction being along the central axis Ax, the plural piezoelectric elements 522 generate ultrasound vibration that is longitudinal vibration along the central axis Ax.

The front mass 523 enlarges the amplitude of ultrasound vibration generated by the plural piezoelectric elements 522. The front mass 523 has a long shape extending linearly along the central axis Ax. The front mass 523 includes, as illustrated in FIG. 2, a first attachment portion 523a, a sectional area changing portion 523b, and a second attachment portion 523c.

The first attachment portion 523a is a bolt extending linearly along the central axis Ax and is inserted through each of the openings in the centers of the plural electrode plates 521 and plural piezoelectric elements 522. A back mass 524 is attached to an end portion of the first attachment portion 523a, the end portion being in the proximal direction Ar2, as illustrated in FIG. 2.

The sectional area changing portion (a horn) 523b is a part that is provided at an end portion of the first attachment portion 523a and that enlarges the amplitude of ultrasound vibration, the end portion being in the distal direction Ar1. This sectional area changing portion 523b has an end portion having a diameter dimension set more largely than that of the first attachment portion 523a, the end portion being in the proximal direction Ar2, and has a truncated cone shape that decreases in sectional area in the distal direction Ar1. That is, the plural electrode plates 521 and plural piezoelectric elements 522 are united with one another in an approximately cylindrical shape by being held between the sectional area changing portion 523b and the back mass 524.

As illustrated in FIG. 2, the second attachment portion 523c is provided at an end portion of the sectional area changing portion 523b, the end portion being in the distal direction Ar1, and extends linearly along the central axis Ax. The end portion of the vibration transmitting member 46, the end portion being in the proximal direction Ar2, is connected to an end portion of the second attachment portion 523c, the end portion being in the distal direction Ar1, in a state where the ultrasound transducer unit 5 has been connected to the handpiece 4.

The electric wiring 525 is a part that electrically connects mutually adjacent ones of the electrode plates 521 to each other. This electric wiring 525 includes, as illustrated in FIG. 2, negative electrode wiring 525a that electrically connects mutually adjacent ones of the negative electrode plates 521a to each other, and positive electrode wiring 525b that electrically connects mutually adjacent ones of the positive electrode plates 521b to each other. The electric wiring 525 is provided around the approximately cylindrical shape of the plural electrode plates 521 and plural piezoelectric elements 522 that have been united with one another.

Configuration of Control Device

Figure 3:
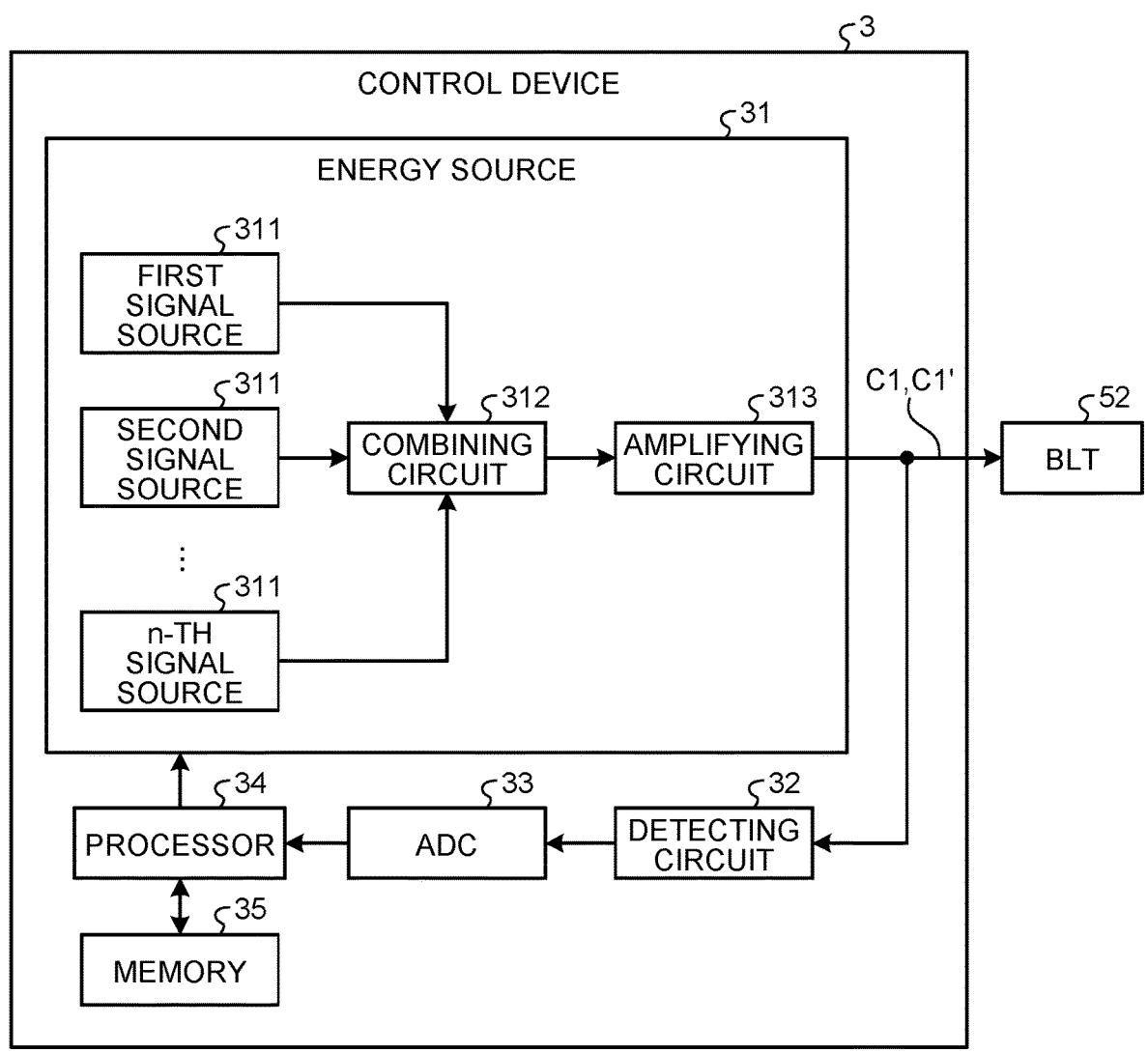
FIG. 3 is a block diagram illustrating a configuration of a control device.

FIG. 3 is a block diagram illustrating a configuration of the control device 3.

The treatment tool 2 is detachably connected to the control device 3 by the electric cable C. The control device 3 integrally controls operation of the treatment tool 2 through the electric cable C. This control device 3 includes, as illustrated in FIG. 3, an energy source 31, a detecting circuit 32, an analog to digital converter (ADC) 33, a processor 34, and a memory 35.

A pair of lead wires C1 and C1' forming the electric cable C are respectively connected to one of the negative electrode plates 521a, the one being positioned furthest in the proximal direction Ar2, and one of the positive electrodes plates 521b, the one being positioned furthest in the proximal direction Ar2, as illustrated in FIG. 2. For convenience of explanation, in FIG. 3, the pair of lead wires C1 and C1' are each represented by a single line.

The energy source 31 corresponds to a combined signal generator. Under control of the processor 34, this energy source 31 generates a combined signal having plural frequency components, or a drive signal that is alternating-current power that drives the BLT 52 (causes the BLT 52 to generate ultrasound vibration). The energy source 31 supplies the generated combines signal or drive signal to the BLT 52 via the pair of lead wires C1 and C1'.

For convenience of explanation, the combined signal supplied from the energy source 31 to the BLT 52 will hereinafter be referred to as an input combined signal, and a signal resulting from change of the input combined signal by frequency response of the BLT 52 will hereinafter be referred to as an output combined signal. Similarly, the drive signal supplied to the BLT 52 from the energy source 31 will be referred to as an input drive signal, and a signal resulting from change of the input drive signal by frequency response of the BLT 52 will be referred to as an output drive signal.

The energy source 31 includes, as illustrated in FIG. 3, first to n-th signal sources 311, a combining circuit 312, and an amplifying circuit 313.

The first to n-th signal sources 311 correspond to plural signal sources, and respectively output signals having frequencies different from one another. The frequencies of the signals output from the first to n-th signal sources 311 in this embodiment decrease in order from the first to the n-th signal sources 311 by a first frequency each. For convenience of explanation, this first frequency will be assumed to be "0.1 kHz" in the following description. Furthermore, the first signal source 311 is assumed to output a signal of 49.0 kHz. In addition, the n-th signal source 311 is assumed to output a signal of 45.0 kHz. That is, "n" is "41". Furthermore, the signals output respectively from the first to n-th signal sources 311 all have the same amplitude. The first frequency may be another frequency without being limited to "0.1 kHz".

The combining circuit 312 generates an input combined signal by combining signals output respectively from all of the first to n-th signal sources 311. The combining circuit 312 then outputs the input combined signal to the amplifying circuit 313.

Figure 4:
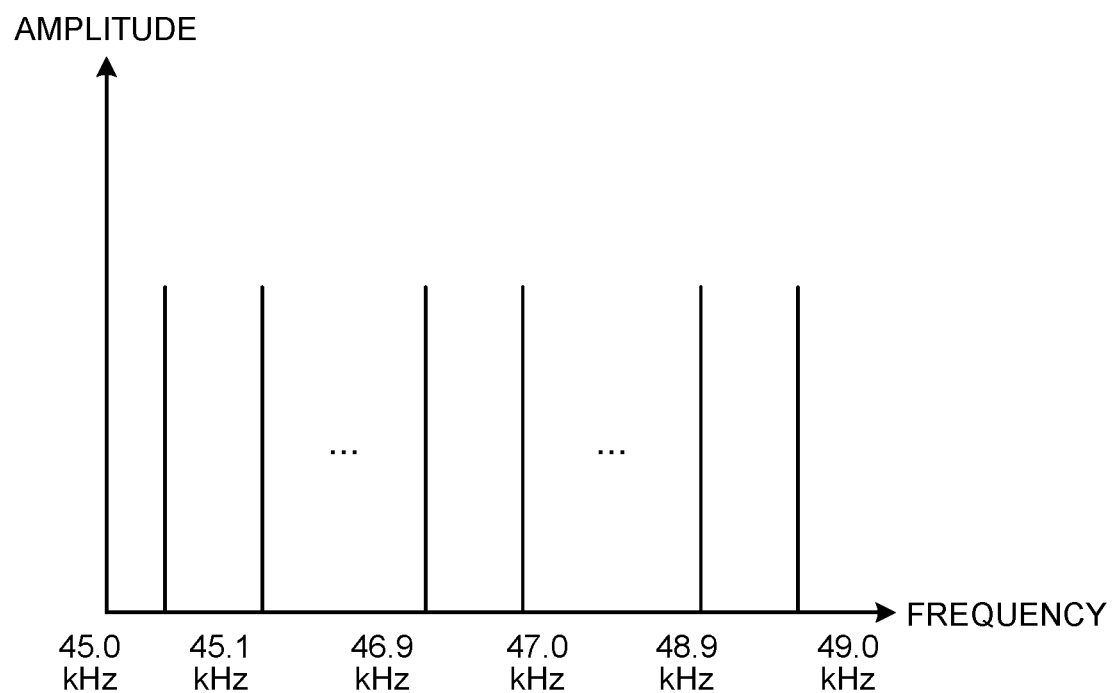
FIG. 4 is a diagram illustrating a frequency spectrum of an input combined signal.

FIG. 4 is a diagram illustrating an example of a frequency spectrum of the input combined signal.

The input combines signal has, as illustrated in FIG. 4, frequency components of the signals respectively output from the first to n-th signal sources 311. Furthermore, these frequency components have the same amplitude.

In addition, in a case where only one of the first to n-th signal sources 311 is operating, the combining circuit 312 outputs an input drive signal that is a signal output from that one signal source 311 that is operating, to the amplifying circuit 313, under control of the processor 34.

The amplifying circuit 313 is an amplifier that amplifies an input combined signal or input drive signal output from the combining circuit 312. The input combined signal or input drive signal output from the amplifying circuit 313 is supplied to the BLT 52 via the pair of lead wires C1 and C1'.

The detecting circuit 32 corresponds to a detector. This detecting circuit 32 is formed of at least one of an electric current sensor that detects an electric current value and an electric voltage sensor that detects an electric voltage value. The detecting circuit 32 outputs a first US signal (an analog signal) by detecting an output combined signal, and outputs a second US signal (an analog signal) by detecting an output drive signal.

The first US signal corresponds to a detected signal. Examples of the first US signal include: a phase signal (hereinafter, referred to as a first US voltage phase signal $\theta V1$) for electric voltage of an output combined signal; a phase signal (hereinafter, referred to as a first US current phase signal $\theta I1$) for electric current of the output combined signal; a phase difference (hereinafter, referred to as a first phase difference ($\theta V1-\theta I1$)) between the electric voltage and electric current of the output combined signal; an electric current value (hereinafter, referred to as a first US current I1) of the output combined signal; an electric voltage value (hereinafter, referred to as a first US voltage V1) of the output combined signal; and an impedance value (hereinafter, referred to as a first US impedance R1) calculated from the first US current I1 and the first US voltage V1.

Furthermore, examples of the second US signal include: a phase signal (hereinafter, referred to as a second US voltage phase signal $\theta V2$) for electric voltage of an output drive signal; a phase signal (hereinafter, referred to as a second US current phase signal $\theta I2$) for electric current of the output drive signal; a phase difference (hereinafter, referred to as a second phase difference ($\theta V2-\theta I2$)) between the electric voltage and the electric current of the output drive signal; an electric current value (hereinafter, referred to as a second US current I2) of the output drive signal; an electric voltage value (hereinafter, referred to as a second US voltage V2) of the output drive signal; and an impedance value (hereinafter, referred to as a second US impedance R2) calculated from the second US current I2 and the second US voltage V2.

The ADC 33 converts a first US signal (an analog signal) or a second US signal (an analog signal) output from the detecting circuit 32, into a digital signal. The ADC 33 then outputs the converted first US signal (a digital signal) or a second US signal (a digital signal), to the processor 34.

The processor 34 is, for example, a central processing unit (CPU) or a field-programmable gate array (FPGA) and is electrically connected to the switch 43 in a state where the treatment tool 2 has been connected to the control device 3 by the electric cable C. The processor 34 controls operation of the whole ultrasonic treatment system 1 according to a program stored in the memory 35. This processor 34 has functions of a frequency separator and a frequency determiner. Functions of the processor 34 will be described in the later section, "Operation of Ultrasonic Treatment System".

The memory 35 stores therein, for example, the program executed by the processor 34 and information needed for processing by the processor 34.

Operation of Ultrasonic Treatment System Operation (including a resonance frequency searching method) of the ultrasonic treatment system 1 described above will be described next.

Figure 5:
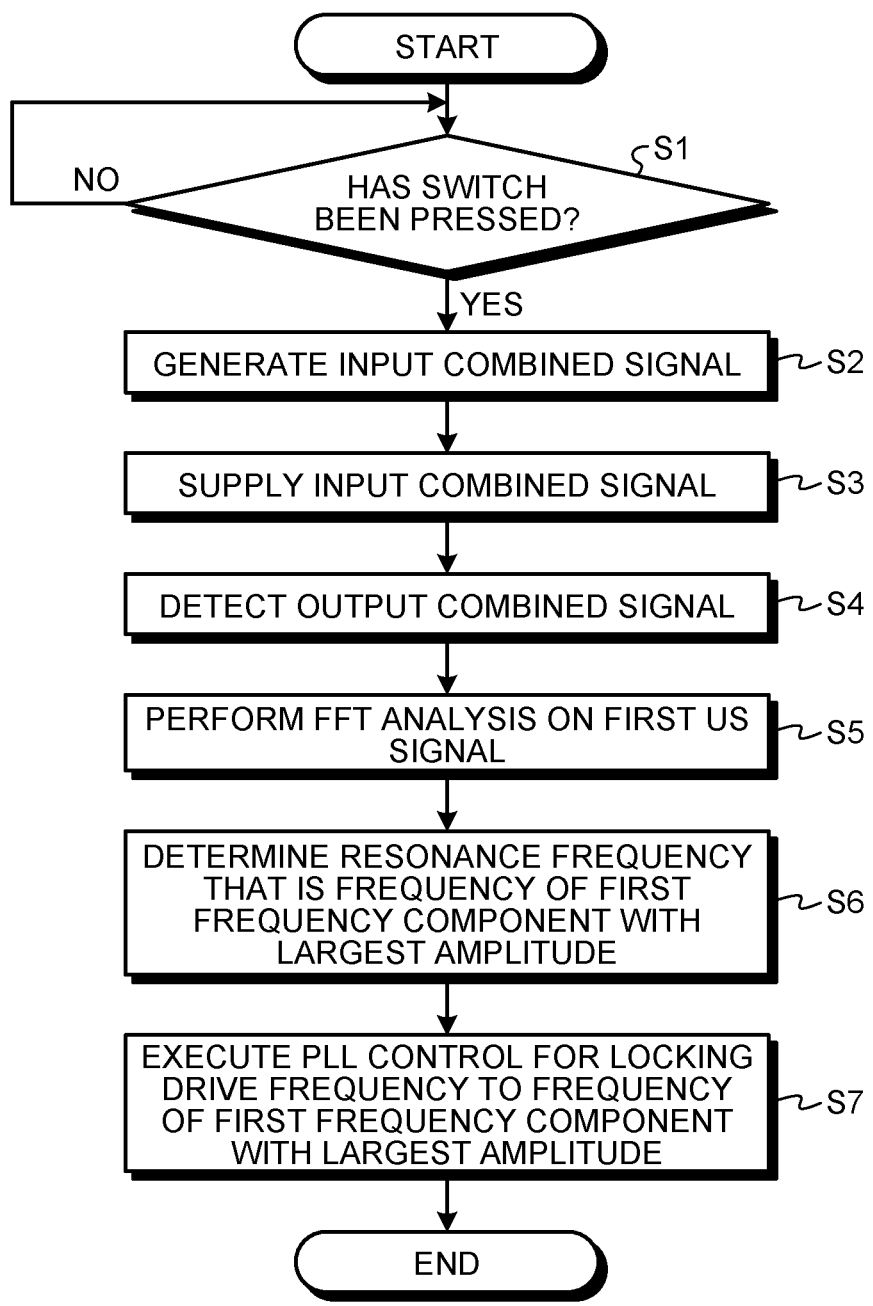
FIG. 5 is a flowchart illustrating operation of the ultrasonic treatment system.

FIG. 5 is a flowchart illustrating operation of the ultrasonic treatment system 1.

An operator inserts a part of the treatment tool 2, the part being in the distal direction Ar1, into an abdominal cavity through the abdominal wall by using, for example, a trocar. The operator then performs opening and closing operation on the operating knob 42 to hold a target part between the jaw 45 and the end portion of the vibration transmitting member 46, the end portion being in the distal direction Ar1. Thereafter, the operator presses the switch 43 (Step S1: Yes).

When the switch 43 is pressed (Step S1: Yes), the processor 34 outputs a control signal to the energy source 31. The combining circuit 312 in the energy source 31 combines signals output respectively from all of the first to n-th signal sources 311 to generate an input combined signal (Step S2: a combined signal generating step). Furthermore, the energy source 31 supplies the input combined signal that has been generated at Step S2 and amplified by the amplifying circuit 313, to the BLT 52, via the pair of lead wires C1 and C1' (Step S3: a combined signal generating step).

After Step S3, the detecting circuit 32 outputs a first US signal (an analog signal) by detecting the output combined signal (Step S4: a detecting step).

Figure 6:
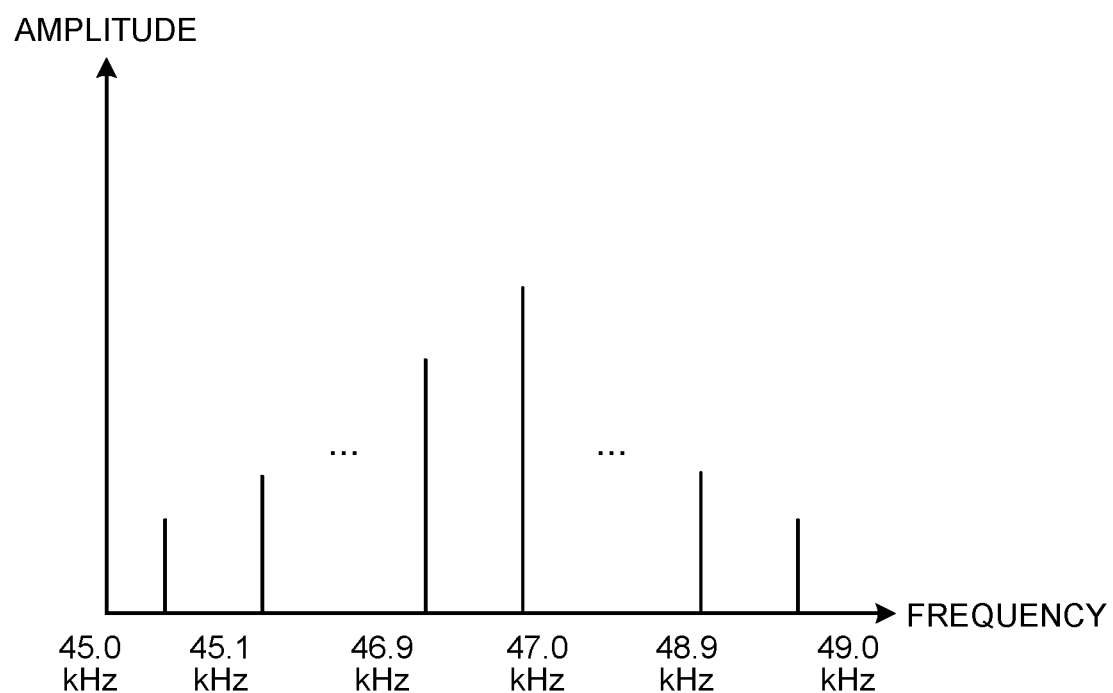
FIG. 6 is a diagram illustrating a frequency spectrum of a first US signal.
Figure 7:
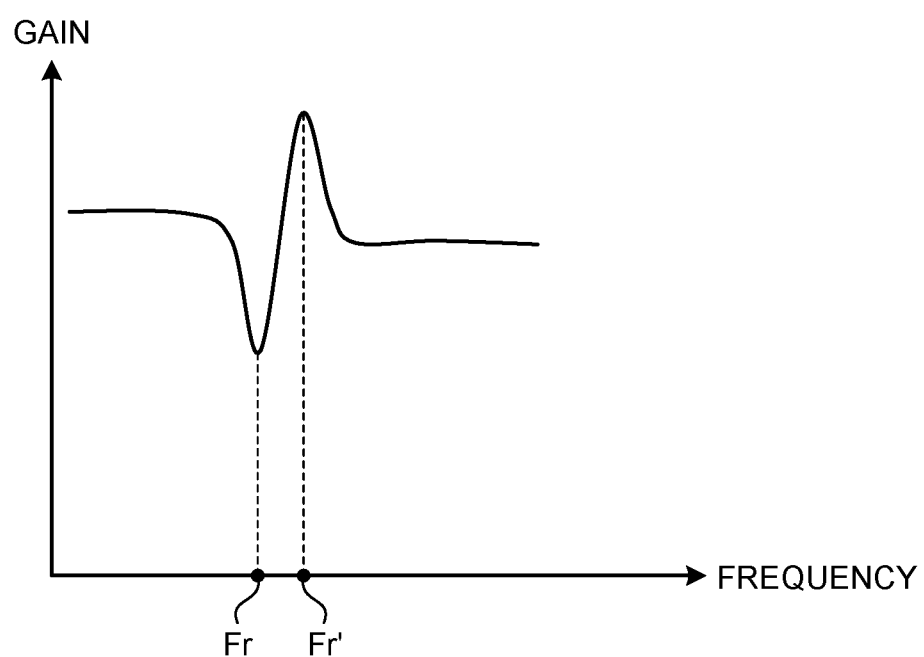
FIG. 7 is a diagram illustrating frequency characteristics of a BLT.

FIG. 6 is a diagram illustrating an example of a frequency spectrum of the first US signal. FIG. 7 is a diagram illustrating frequency characteristics of the BLT 52.

The BLT 52 has frequency characteristics such that, as illustrated in FIG. 7, the gain (the impedance) reaches its extreme values respectively at a resonance frequency Fr and an antiresonance frequency Fr'. Furthermore, as described above, the plural frequency components forming the input combined signal have the same amplitude. Therefore, the first US signal corresponding to the output combined signal resulting from change of the input combined signal by the frequency response of the BLT 52 has, as illustrated in FIG. 6: frequency components that are the same as the plural frequency components forming the input combined signal; and a mountain-shaped frequency spectrum having the largest amplitude at the resonance frequency Fr. The first US signal illustrated in FIG. 6 corresponds to, for example, the first US current I1, the first US voltage V1, or the first US impedance R1.

After Step S4, the processor 34 separates the first US signal (the digital signal) output from the detecting circuit 32 and converted by the ADC 33 into plural frequency components by fast Fourier transform (FFT) analysis (Step S5: a frequency separating step).

After Step S5, the processor 34 determines a resonance frequency Fr that is the frequency (in the example of FIG. 6, 47.0 kHz) of a first frequency component having the largest amplitude among the plural frequency components separated by the FFT analysis at Step S5 (Step S6: a frequency determining step).

After Step S6, the processor 34 outputs a control signal to the energy source 31 to cause an input drive signal to be output to the BLT 52 and executes PLL control for locking the frequency (hereinafter, referred to as the drive frequency) of the input drive signal to the frequency determined at Step S6 (Step S7).

Specifically, the processor 34 causes only one (in the example of FIG. 6, the 21st signal source 311 that outputs the signal of 47.0 kHz) of the first to n-th signal sources 311 to operate, the one being a signal source 311 that outputs a signal having the frequency determined at Step S6. The energy source 31 thereby supplies an input drive signal that is the signal output from that one signal source 311, to the BLT 52. On the basis of a second US signal (for example, a second phase difference ($\theta$V2−$\theta$I2)) output from the detecting circuit 32, the processor 34 executes PLL control for locking the drive frequency to the frequency determined at Step S6. For example, if the second phase difference ($\theta$V2−$\theta$I2) becomes larger than 0, the processor 34 stops the operation of the signal source 311 that has been operating, and causes only one of the signal sources 311 to operate, the one being a signal source 311 that outputs a signal having a frequency that is lower by 0.1 kHz than that of the signal source 311 that has been operating. That is, the processor 34 lowers the drive frequency by 0.1 kHz. On the contrary, if the second phase difference ($\theta$V2−$\theta$I2) becomes less than 0, the processor 34 stops the operation of the signal source 311 that has been operating, and causes only one of the signal sources 311 to operate, the one being the signal source 311 that outputs a signal having a frequency 0.1 kHz higher than that of the signal source 311 that has been operating. That is, the processor 34 raises the drive frequency by 0.1 kHz. The processor 34 thereby locks the drive frequency to the frequency determined at Step S6.

By execution of Step S7 described above, the BLT 52 generates ultrasound vibration. The target part that has been held between the jaw 45 and the end portion of the vibration transmitting member 46, the end portion being in the distal direction Ar1, is then treated.

The above described embodiment has the following effects.

The energy source 31 in the control device 3 according to the above embodiment generates an input combined signal having plural frequency components and supplies the input combined signal to the BLT 52. Furthermore, the detecting circuit 32 detects an output combined signal resulting from change of the input combined signal by the frequency response of the BLT 52 and outputs a first US signal corresponding to the output combined signal. The processor 34 then separates the first US signal into plural frequency components, and determines, on the basis of the plural frequency components, the resonance frequency Fr of the BLT 52.

Sweep of the drive frequency that has been performed conventionally is thus not needed in a search for the resonance frequency Fr. Therefore, the control device 3 according to the above embodiment enables a search for the resonance frequency Fr in a short period of time.

In particular, the plural frequency components forming the input combined signal have the same amplitude (FIG. 4). Therefore, the first US signal corresponding to the output combined signal resulting from change of the input combined signal by the frequency response of the BLT 52 has: frequency components that are the same as the plural frequency components forming the input combined signal; and a mountain-shaped frequency spectrum having the largest amplitude at the resonance frequency Fr.

Accordingly, just by a search for a frequency component with the largest amplitude, the resonance frequency Fr is able to be determined readily.

Furthermore, the processor 34 determines the resonance frequency Fr by FFT analysis.

Therefore, an input combined signal that will not cause the BLT 52 to generate ultrasound vibration is able to be used. The resonance frequency Fr is able to be determined accurately in a state where the signal-to-noise ratio (S/N) has been improved considerably.

Another exemplary embodiment will be described next with reference to FIGS. 8 to 9.

In the following description, any component that is the same as that of the above described embodiment will be assigned with the same reference sign, and detailed description thereof will be omitted or simplified.

Figure 8:
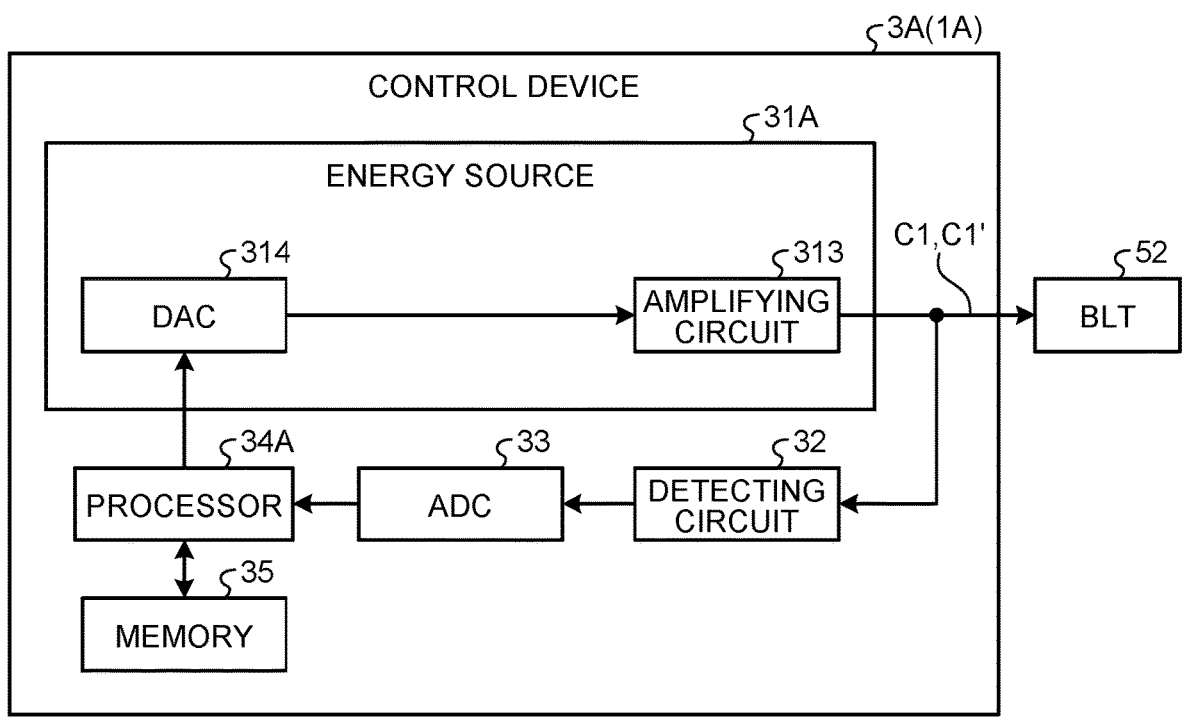
FIG. 8 is a block diagram illustrating a configuration of a control device according to an exemplary embodiment.

FIG. 8 is a block diagram illustrating a configuration of a control device 3A.

In an ultrasonic treatment system 1A according to this embodiment, as illustrated in FIG. 8, the control device 3A that is different from the control device 3 in the ultrasonic treatment system 1 described above with respect to FIGS. 1 to 7 is adopted, and an input combined signal is generated by a different method.

In the control device 3A, as illustrated in FIG. 8, an energy source 31A having a configuration different from that of the energy source 31 of the control device 3 described above, and a processor 34A having functions different from those of the processor 34 thereof are respectively adopted.

As illustrated in FIG. 8, the energy source 31A additionally has a digital to analog converter (DAC) 314 and does not have the first to n-th signal sources 311 and combining circuit 312 in the energy source 31 described above.

The DAC 314 corresponds to a converting circuit. This DAC 314 converts a digital signal output from the processor 34A into an analog signal. The DAC 314 then outputs the converted analog signal to the amplifying circuit 313.

The processor 34A has functions of a frequency separator and a frequency determiner. The functions of the processor 34A will be explained in the later description of operation of the ultrasonic treatment system 1A.

The energy source 31A (the amplifying circuit 313 and the DAC 314) and processor 34A described above correspond to a combined signal generator.

The operation (including a resonance frequency searching method) of the ultrasonic treatment system 1A will be described next.

Figure 9:
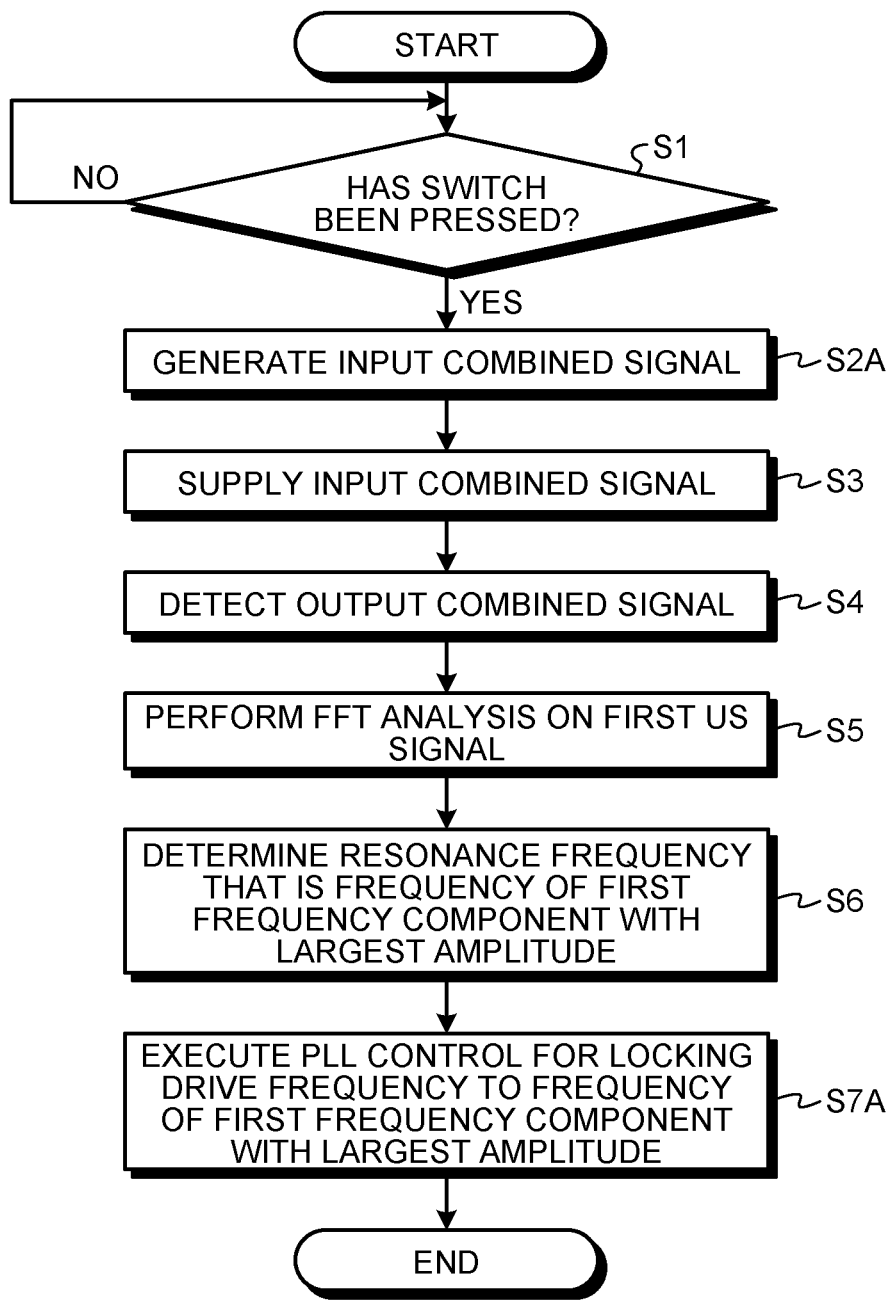
FIG. 9 is a flowchart illustrating operation of an ultrasonic treatment system.

FIG. 9 is a flowchart illustrating the operation of the ultrasonic treatment system 1A.

In the operation of the ultrasonic treatment system 1A, as illustrated in FIG. 9, Steps S2A and S7A are adopted respectively instead of Steps S2 and S7 in the operation of the ultrasonic treatment system 1 described above. Therefore, only Steps S2A and S7A will be described below.

A table for generating an input combined signal (a digital signal) having, for example, the frequency spectrum illustrated in FIG. 4 has been stored in a memory 35 according to the present embodiment.

When the switch 43 is pressed (Step S1: Yes), the processor 34A outputs an input combined signal (a digital signal) to the DAC 314 by referring to the table stored in the memory 35. Furthermore, the DAC 314 converts the input combined signal (the digital signal) into an analog signal. The input combined signal (the analog signal) is generated by the above processing (Step S2A: a combined signal generating step). Thereafter, Steps S3 to S6 are sequentially executed. At Steps S3 to S6, processing executed by the energy source 31A is the same as the processing executed by the energy source 31, and processing executed by the processor 34A is the same as the processing executed by the processor 34.

After Step S6, the processor 34A causes the energy source 31A to supply an input drive signal to the BLT 52 and executes PLL control for locking the drive frequency to the frequency determined at Step S6 (Step S7A).

Specifically, the processor 34A generates an input drive signal (a digital signal) having the frequency determined at Step S6 and outputs this input drive signal (the digital signal) to the DAC 314. The energy source 31 thereby supplies an input drive signal (an analog signal) having the frequency determined at Step S6, to the BLT 52. On the basis of a second US signal (for example, a second phase difference (θV2−θI2)) output from the detecting circuit 32, the processor 34A executes PLL control for locking the drive frequency to the frequency determined at Step S6. For example, if the second phase difference (θV2−θI2) becomes larger than 0, the processor 34A generates an input drive signal (a digital signal) having a frequency 0.1 kHz lower than the frequency of the input drive signal that the processor 34A has been outputting to the DAC 314 and outputs the generated input drive signal (the digital signal) to the DAC 314. That is, the processor 34A lowers the drive frequency by 0.1 kHz. On the contrary, if the second phase difference (θV2−θI2) becomes less than 0, the processor 34A generates an input drive signal (a digital signal) having a frequency 0.1 kHz higher than the frequency of the input drive signal that the processor 34A has been outputting to the DAC 314 and outputs the generated input drive signal (the digital signal) to the DAC 314. That is, the processor 34A raises the drive frequency by 0.1 kHz. The processor 34A thereby locks the drive frequency to the frequency determined at Step S6.

By execution of Step S7 described above, the BLT 52 generates ultrasound vibration. The target part that has been held between the jaw 45 and the end portion of the vibration transmitting member 46, the end portion being in the distal direction Ar1, is then treated.

The present embodiment has the following effects in addition to effects similar to the above described effects.

The combined signal generator is formed of the energy source 31A (the amplifying circuit 313 and DAC 314) and the processor 34A in the control device 3A.

Therefore, the first to n-th signal sources 311 and the combining circuit 312 are able to be omitted and the hardware configuration is able to be made uncomplicated.

The processor 34A in the present embodiment outputs an input combined signal (a digital signal) to the DAC 314 by referring to the table stored in the memory 35, but without being limited to this example, the following configuration may be adopted.

The processor 34A may generate plural sine waves having frequencies different from one another. Furthermore, by combining the plural sine waves, the processor 34A may generate an input combined signal (a digital signal). The processor 34A then may output the input combined signal (the digital signal) to the DAC 314.

Another exemplary embodiment will be described next with respect to FIGS. 10 to 12.

In the following description, any component that is the same as that of the above described embodiment will be assigned with the same reference sign, and detailed description thereof will be omitted or simplified.

Figure 10:
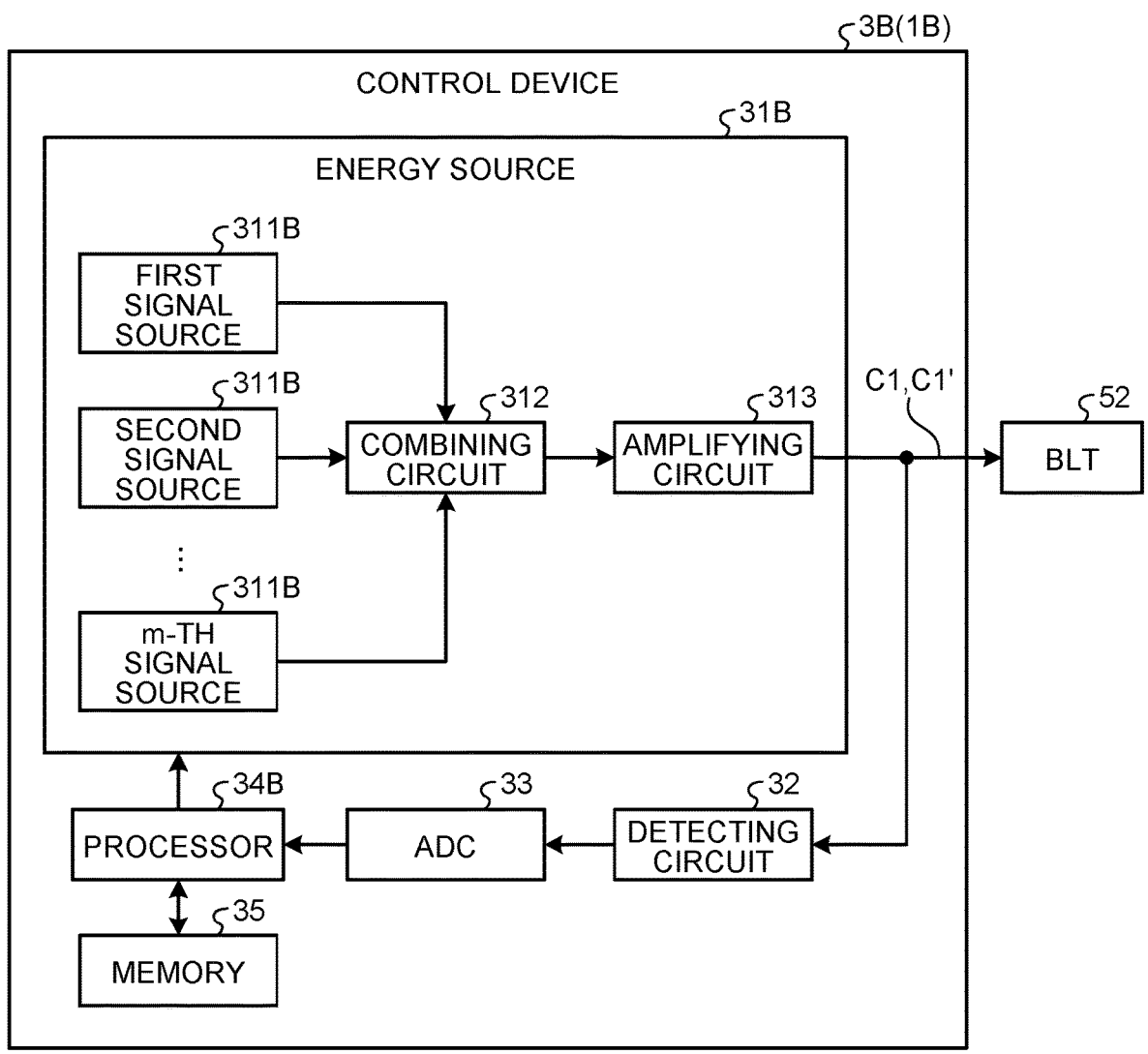
FIG. 10 is a block diagram illustrating a configuration of a control device according to an exemplary embodiment.

FIG. 10 is a block diagram illustrating a configuration of a control device 3B.

In an ultrasonic treatment system 1B according to this embodiment, as illustrated in FIG. 10, the control device 3B that is different from the control device 3 in the ultrasonic treatment system 1 described above is adopted and a search for the resonance frequency Fr is performed by a different method.

In the control device 3B, as illustrated in FIG. 10, an energy source 31B having a configuration different from that of the energy source 31 in the control device 3 described above and a processor 34B having functions different from those of the processor 34 thereof are respectively adopted.

In the energy source 31B, as illustrated in FIG. 10, first to m-th signal sources 311B are adopted instead of the first to n-th signal sources 311.

The first to m-th signal sources 311B correspond to plural signal sources, and respectively output signals having frequencies different from one another. In the present embodiment, frequencies of signals output from the first to m-th signal sources 311B decrease, in order from the first to m-th signal sources 311B, by a second frequency lower than the first frequency each. For convenience of explanation, this second frequency will be assumed to be "0.01 kHz" in the following description. Furthermore, the first signal source 311B is assumed to output a signal of 49.0 kHz. In addition, the m-th signal source 311B is assumed to output a signal of 45.0 kHz. That is "m" is "401". Furthermore, the signals output respectively from the first to m-th signal sources 311B all have the same amplitude. The second frequency may be another frequency without being limited to "0.01 kHz".

This processor 34B has functions of a frequency separator and a frequency determiner. The functions of the processor 34B will be explained in the later description of operation of the ultrasonic treatment system 1B.

The operation (including a resonance frequency searching method) of the ultrasonic treatment system 1B will be described next.

Figure 11:
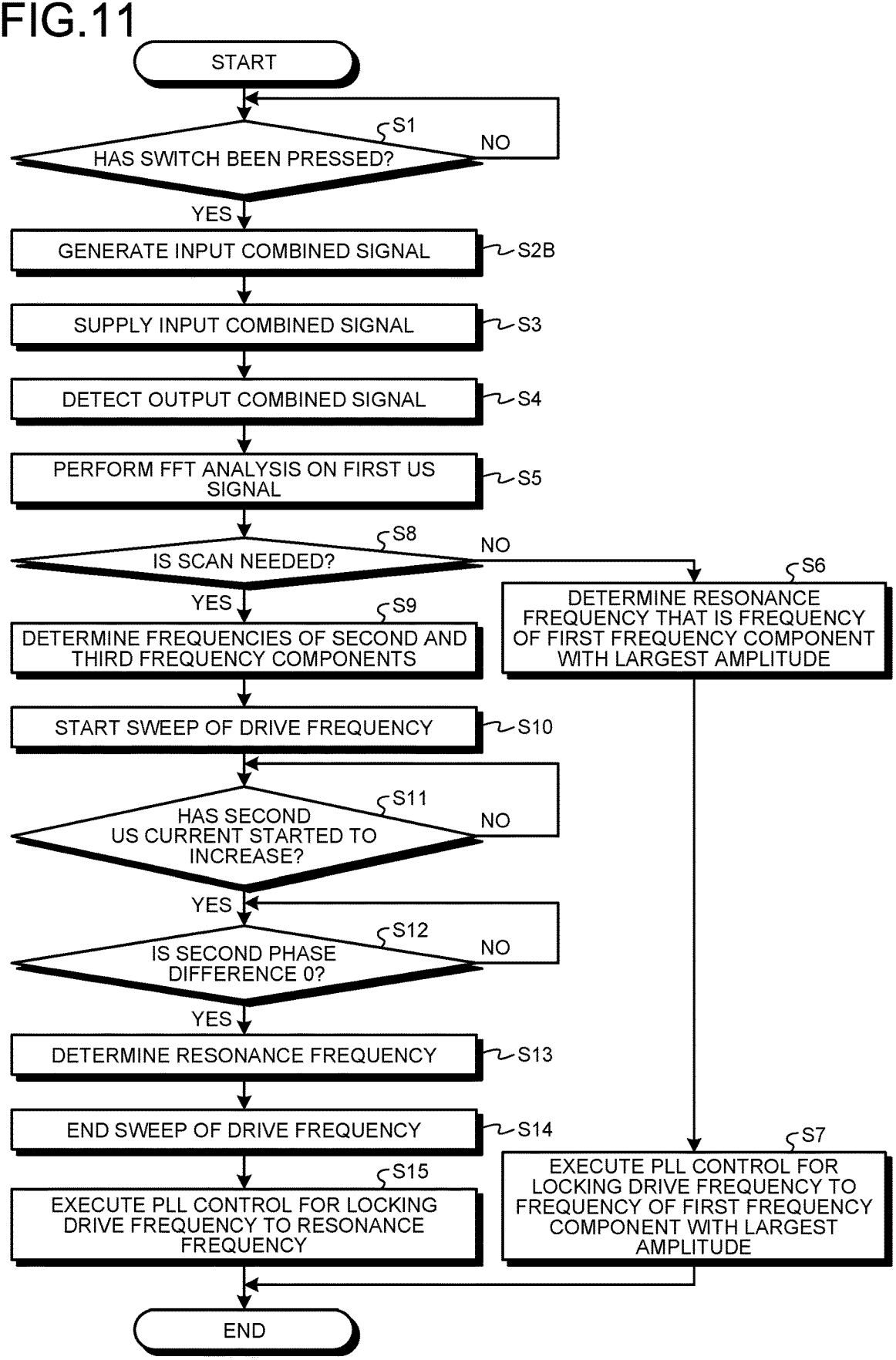
FIG. 11 is a flowchart illustrating operation of an ultrasonic treatment system.

FIG. 11 is a flowchart illustrating the operation of the ultrasonic treatment system 1B.

The operation of the ultrasonic treatment system 1B according to the present embodiment, as illustrated in FIG. 11, has Step S2B adopted instead of Step S2 in the operation of the ultrasonic treatment system 1 described above and additionally has Steps S8 to S15. Therefore, only Step S2B and Steps S8 to S15 will be described below.

When the switch 43 is pressed (Step S1: Yes), the processor 34B outputs a control signal to the energy source 31B. The combining circuit 312 in the energy source 31B then combines signals respectively output from 41 signal sources 311B that output signals having frequencies that are respectively the same as those from the first to nth signal sources 311 described above, the 41 signal sources 311B being those among the 401 first to m-th signal sources 311B, to generate an input combined signal (Step S2B: a combined signal generating step). Thereafter, Steps S3 to S5 are sequentially executed. At Steps S3 to S5, processing executed by the energy source 31B is the same as the processing executed by the energy source 31, and processing executed by the processor 34B is the same as the processing executed by the processor 34.

After Step S5, the processor 34B determines, on the basis of the separated plural frequency components resulting from the FFT analysis of the first US signal at Step S5, whether or not a scan is needed (Step S8).

Figure 12:
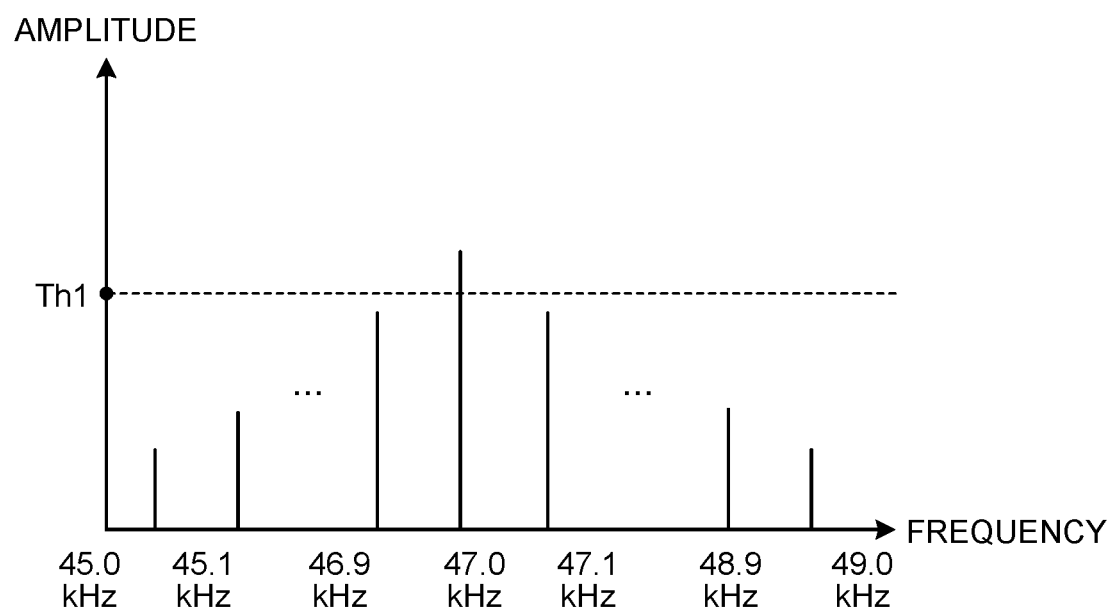
FIG. 12 is a diagram for explanation of Step S8.

FIG. 12 is a diagram for explanation of Step S8.

For example, in a case where the first US signal corresponds to the first US current I1, the first US voltage V1, or the first US impedance R1, the processor 34B determines, as illustrated in FIG. 12, whether or not the amplitude of a first frequency component (in the example of FIG. 12, 47.0 kHz) having the largest amplitude among the separated plural frequency components resulting from the FFT analysis of the first US signal at Step S5 is equal to or larger than a predetermined amplitude Th1. If it has been determined that the amplitude of the first frequency component is equal to or larger than the predetermined amplitude Th1, the processor 34B determines that a scan is not needed (Step S8: No). On the contrary, if it has been determined that the amplitude of the first frequency component is less than the predetermined amplitude Th1, the processor 34B determines that a scan is needed (Step S8: Yes).

If it has been determined that a scan is not needed (Step S8: No), Steps S6 and S7 are sequentially executed. At Steps S6 and S7, processing executed by the energy source 31B is the same as the processing executed by the energy source 31, and processing executed by the processor 34B is the same as the processing executed by the processor 34.

On the contrary, if it has been determined that a scan is needed (Step S8: Yes), the processor 34B determines each of the frequency (for example, 47.1 kHz) of a second frequency component immediately after the frequency (for example, 47.0 kHz) of the first frequency component and the frequency (for example, 46.9 kHz) of a third frequency component immediately before the frequency of the first frequency component, from the plural frequency components separated by the FFT analysis at Step S5 (Step S9).

After Step S9, the processor 34B causes the energy source 31B to supply an input drive signal to the BLT 52 and starts a sweep of the drive frequency over a sweep range from the frequency (for example, 47.1 kHz) of the second frequency component to the frequency (for example, 46.9 kHz) of the third frequency component, these frequencies having been determined at Step S9 (Step S10).

Specifically, the processor 34B causes only one (for example, the 191st signal source 311B) of the first to m-th signal sources 311B to operate, the one being the signal source 311B that outputs a signal having the frequency (for example, 47.1 kHz) of the second frequency component determined at Step S9. The energy source 31 thereby supplies an input drive signal having a drive frequency that is the frequency of the second frequency component, to the BLT 52. The processor 34B then sequentially changes the signal source 311B caused to operate, to the signal source 311B that outputs a signal having a frequency 0.01 kHz lower than that from the signal source 311B currently being caused to operate. The drive frequency thereby decreases sequentially by 0.01 kHz each from the frequency (for example, 47.1 kHz) of the second frequency component.

After Step S10, the processor 34B constantly monitors whether or not the second US signal (the second US current I2) output from the detecting circuit 32 has started to increase (Step S11). When the drive frequency exceeds the antiresonance frequency Fr' by the sweep of the drive frequency, the second US current I2 starts to rise. That is, the processor 34B constantly monitors whether or not the drive frequency has exceeded the antiresonance frequency Fr'.

If it is determined that the second US current I2 has started to rise (Step S11: Yes), the processor 34B constantly monitors, on the basis of a second US signal (a second phase difference (θV2−θI2)) output from the detecting circuit 32, whether or not the second phase difference (θV2−θI2) has become 0 (Step S12). When the drive frequency becomes the resonance frequency Fr, the second phase difference (θV2−θI2) becomes 0. That is, at Step S12, the processor 34B is searching for a point where the drive frequency becomes the resonance frequency Fr as a result of the sweep of the drive frequency.

If it is determined that the second phase difference (θV2−θI2) has become 0 (Step S12: Yes), the processor 34B determines the drive frequency at the time when the second phase difference (θV2−θI2) became 0 as the resonance frequency Fr (Step S13). Furthermore, the processor 34B ends the sweep of the drive frequency (Step S14).

After Step S14, the processor 34B outputs a control signal to the energy source 31B to causes an input drive signal to be supplied to the BLT 52 and executes PLL control for locking the drive frequency to the resonance frequency Fr determined at Step S13 (Step S15).

Specifically, the processor 34B causes only one of the first to m-th signal sources 311B to operate, the one being the signal source 311B that outputs a signal having the resonance frequency Fr determined at Step S13. The energy source 31B thereby supplies an input drive signal that is the signal output from that one signal source 311B, to the BLT 52. On the basis of a second US signal (for example, a second phase difference (θV2−θI2)) output from the detecting circuit 32, the processor 34B executes PLL control for locking the drive frequency to the resonance frequency Fr determined at Step S13. For example, if the second phase difference (θV2−θI2) becomes larger than 0, the processor 34B stops the operation of the signal source 311B that has been operating, and causes only one of the signal sources 311B to operate, the one being the signal source 311B that outputs a signal having a frequency 0.01 kHz lower than that of the signal source 311B that has been operating. That is, the processor 34B lowers the drive frequency by 0.01 kHz. On the contrary, if the second phase difference (θV2−θI2) becomes less than 0, the processor 34B stops the operation of the signal source 311B that has been operating, and causes only one of the signal sources 311B to operate, the one being the signal source 311B that outputs a signal having a frequency 0.01 kHz higher than that of the signal source 311B that has been operating. That is, the processor 34B raises the drive frequency by 0.01 kHz. The processor 34B thereby locks the drive frequency to the resonance frequency Fr determined at Step S13.

By execution of Step S15 described above, the BLT 52 generates ultrasound vibration. The target part that has been held between the jaw 45 and the end portion of the vibration transmitting member 46, the end portion being in the distal direction Ar1, is then treated.

The present embodiment has the following effects in addition to effects similar to the above described effects.

The processor 34B in the control device 3B according to the present embodiment searches for the resonance frequency Fr by sweeping the drive frequency over the sweep range from the frequency of the second frequency component to the frequency of the third frequency component when the amplitude of the first frequency component is less than the predetermined amplitude Th1.

Therefore, the resonance frequency Fr is able to be determined accurately. Furthermore, the sweep range is between the frequency of the second frequency component and the frequency of the third frequency component, and is thus narrower than conventional sweep ranges. Therefore, the search for the resonance frequency Fr does not take much time.

In the present embodiment, Steps S6 to S8 may be omitted, and Steps S9 to S15 may be sequentially executed after Step S5.

Furthermore, the signals sources 311B are sequentially changed when the drive frequency is swept over the sweep range from the frequency of the second frequency component to the frequency of the third frequency component (Steps S10 to S14), but without being limited to this example, the following configuration may be adopted.

For example, the energy source 31B may include, similarly to the embodiment described above with respect to FIGS. 1 to 7, the first to n-th signal sources 311, instead of the first to m-th signal sources 311B. Furthermore, the control device 3B may include the DAC 314 described above with respect to the embodiment described with respect to FIGS. 8 to 9. The processor 34B then may generate an input drive signal (a digital signal) of a second frequency component determined at Step S9 and output the input drive signal (the digital signal) to the DAC 314 (Step S10). The energy source 31B may thereby supply an input drive signal (an analog signal) of the second frequency component to the BLT 52. The processor 34B then may sequentially lower the frequency of the input drive signal (the digital signal) to be generated, from the second frequency component, by the second frequency (for example, 0.01 kHz) each. That is, the drive frequency of the input drive signal (the analog signal) supplied to the BLT 52 may be sequentially lowered from the second frequency component by the second frequency (for example, 0.01 kHz) each. In this process, the processor 34B may determine the resonance frequency Fr by executing Steps S11 to S13.

Another exemplary embodiment will be described next with respect to FIGS. 13 to 14.

In the following description, any component that is the same as that of the above described embodiment will be assigned with the same reference sign, and detailed description thereof will be omitted or simplified.

Figure 13:
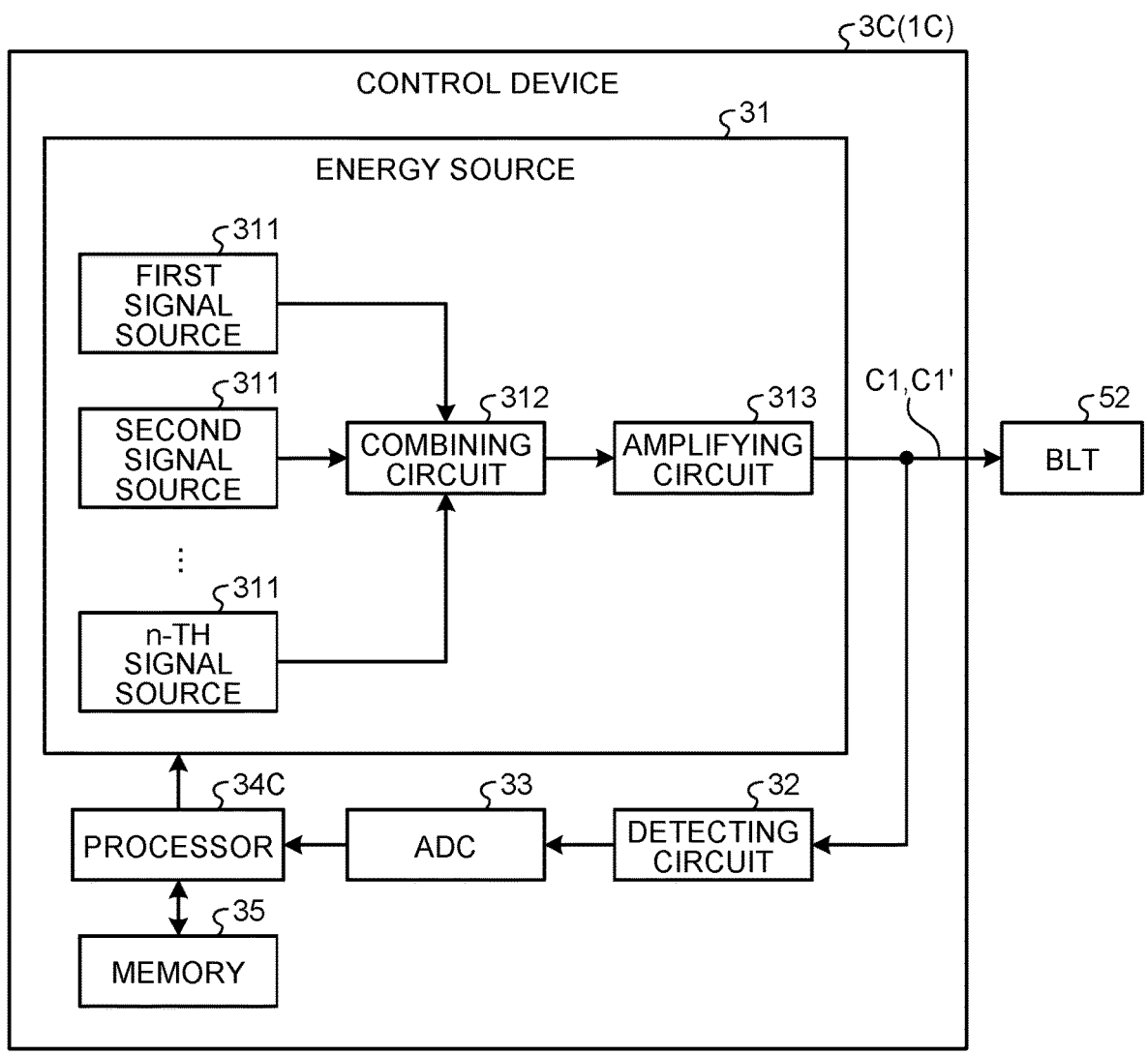
FIG. 13 is a block diagram illustrating a configuration of a control device according to an exemplary embodiment.

FIG. 13 is a block diagram illustrating a configuration of a control device 3C according to the present embodiment.

In an ultrasonic treatment system 1C according to the present embodiment, as illustrated in FIG. 13, the control device 3C different from the control device 3 in the ultrasonic treatment system 1 described above is adopted and a search for the resonance frequency Fr is performed at a different time.

In the control device 3C, as illustrated in FIG. 13, a processor 34C having functions different from those of the processor 34 in the control device 3 described above is adopted.

This processor 34C has functions of a frequency separator and a frequency determiner. The functions of the processor 34C will be explained in the later description of operation of the ultrasonic treatment system 1C.

The operation (including a resonance frequency searching method) of the ultrasonic treatment system 1C will be described next.

Figure 14:
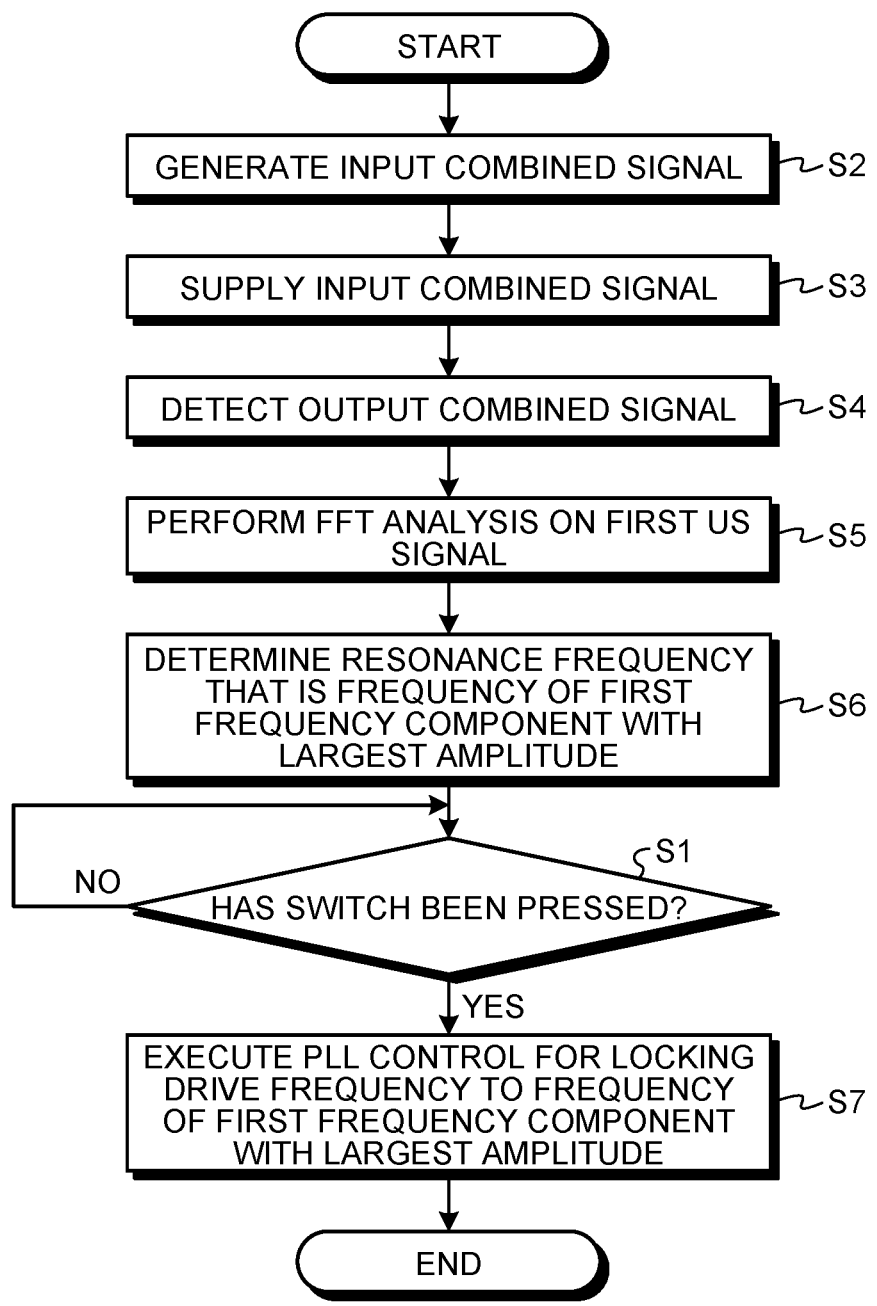
FIG. 14 is a flowchart illustrating operation of an ultrasonic treatment system.

FIG. 14 is a flowchart illustrating the operation of the ultrasonic treatment system 1C.

In the operation of the ultrasonic treatment system 1C according to this embodiment, as illustrated in FIG. 14, Steps S2 to S6 are executed in a standby mode that is a state where electric power has been applied to the ultrasonic treatment system 1C, the state being before the switch 43 is pressed (Step S1: Yes). When the switch 43 is pressed (Step S1: Yes), Step S7 is then executed.

Processing executed by the processor 34C at Steps S2 to S7 is the same as the processing executed by the processor 34.

The present embodiment has the following effects in addition to the effects similar to the above described effects.

The control device 3C according to the present embodiment determines the resonance frequency Fr by executing Steps S2 to S6 in the standby mode. The control device 3C then causes an input drive signal to be supplied from the energy source 31 to the BLT 52 and executes PLL control for locking the drive frequency to the resonance frequency Fr determined in the standby mode, when the switch 43 is pressed.

Therefore, treatment of the target part is immediately started when the switch 43 is pressed, and the treatment time period is thus able to be shortened.

In the present embodiment, Steps S2 to S6 are executed once only in the standby mode, but without being limited to this example, Steps S2 to S6 may be repeatedly executed for a plural number of times. In the PLL control executed by the processor 34C at Step S7 in this case, the drive frequency is locked to the latest one of the plural resonance frequencies Fr determined by the repeated execution of Steps S2 to S6 for the plural number of times.

Other Embodiments

Modes for implementing the disclosure have been described above, but the disclosure is not to be limited only to the above described embodiments.

In the embodiments described above, the first US current I1, the first US voltage V1, or the first US impedance R1 is used as the first US signal, and the frequency of the first frequency component having the largest amplitude among the plural frequency components forming the first US signal is determined as the resonance frequency Fr, but the disclosure is not limited to this example.

For example, the first phase difference ($\theta$V1−$\theta$I1) may be adopted as the first US signal. In this case, the first US signal has: frequency components that are the same as the plural frequency components (FIG. 4) forming the input combined signal; and a valley-shaped frequency spectrum in which the first phase difference ($\theta$V1−$\theta$I1) has the smallest value at the resonance frequency Fr (see FIG. 15). Therefore, the frequency of a fourth frequency component having the smallest first phase difference ($\theta$V1−$\theta$I1) among the plural frequency components forming the first US signal may be determined as the resonance frequency Fr.

Figure 15:
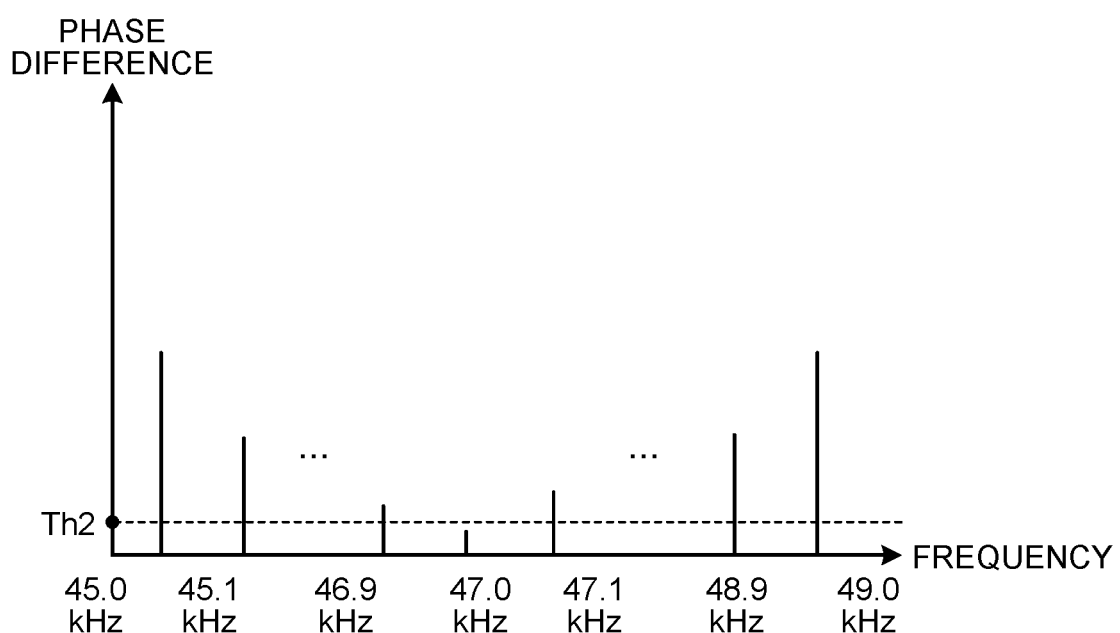
FIG. 15 is a diagram illustrating a phase difference of a plurality of separated frequency components from a first US signal.

FIG. 15 is a diagram illustrating an exemplary modification of the embodiment described above with respect to FIGS. 10 to 12.

In a case where the first phase difference ($\theta$V1−$\theta$I1) is used in the embodiment described above, the processor 34B executes Step S8 as described below.

That is, as illustrated in FIG. 15, the processor 34B determines whether or not the first phase difference ($\theta$V1−$\theta$I1) of the fourth frequency component (47.0 kHz in the example of FIG. 15) having the smallest first phase difference ($\theta$V1−$\theta$I1) among the separated plural frequency components resulting from the FFT analysis of the first US signal at Step S5 is equal to or less than a predetermined phase difference Th2. If it has been determined that the first phase difference ($\theta$V1−$\theta$I1) of the fourth frequency component is equal to or less than the predetermined phase difference Th2, the processor 34B then determines that a scan is not needed (Step S8: No). On the contrary, if it has been determined that the first phase difference ($\theta$V1−$\theta$I1) of the fourth frequency component is larger than the predetermined phase difference Th2, the processor 34B determines that a scan is needed (Step S8: Yes).

Furthermore, at Step S9, the processor 34B determines each of the frequency (for example, 47.1 kHz) of a fifth frequency component that is immediately after the frequency (for example, 47.0 kHz) of the fourth frequency component, and the frequency (for example, 46.9 kHz) of a sixth frequency component that is immediately before the frequency of the fourth frequency component. The processor 34B then starts a sweep of the drive frequency over a sweep range from the frequency (for example, 47.1 kHz) of the fifth frequency component to the frequency (for example, 46.9 kHz) of the sixth frequency component, these frequencies having been determined at Step S9 (Step S10).

In the embodiments described above, FFT analysis is used to separate a first US signal into plural frequency components, but without being limited to FFT analysis, any other method may be adopted.

In the embodiments described above, a configuration for applying ultrasound energy to a target part is adopted, but without being limited to this configuration, a configuration for applying ultrasound energy and at least one of high-frequency energy and heat energy to a target part may be adopted. "Applying high-frequency energy to a target part" herein means passing high-frequency electric current through a target part. Furthermore, "applying heat energy to a target part" means transmitting heat from a heater, for example, to a target part.

Furthermore, the flow indicating the operation of the ultrasonic treatment system 1, 1A, 1B, or 1C is not limited to the sequence of the processing in the flowcharts (FIG. 5, FIG. 9, FIG. 11, or FIG. 14) described above, and may be modified so long as no contradiction arises from the modification.

A control device, an ultrasonic treatment system, and a resonance frequency searching method according to the disclosure enable a search for a resonance frequency of an ultrasound transducer in a short period of time.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control device, comprising:
    an energy source configured to supply an input combined signal having a plurality of frequency components to an ultrasound transducer;
    a detector configured to detect an output combined signal resulting from a change of the input combined signal, and output a detected signal according to the output combined signal; and
    a processor configured to:
        separate the detected signal into a plurality of frequency components,
        based on the plurality of frequency components, determine whether or not to perform a scan,
        when the scan is performed, sweep a frequency of a drive signal supplied to the ultrasound transducer over a sweep range to determine a resonance frequency of the ultrasound transducer, and
    wherein the sweep range includes a first frequency component having a largest amplitude among the plurality of frequency components separated, the sweep range is between a second frequency component and a third frequency component, the second frequency component is after the first frequency component, and the third frequency component is before the first frequency component.

2. The control device according to claim 1, wherein the energy source comprises:
a plurality of signal sources configured to respectively output signals having frequencies different from one another; and
a combining circuit configured to generate the input combined signal by combining the signals respectively output from the plurality of signal sources.

3. The control device according to claim 1, wherein:
the processor is further configured to output the input combined signal as a digital signal to the energy source; and
the energy source comprises a converting circuit that is configured to convert the input combined signal that is the digital signal, into an analog signal.

4. The control device according to claim 1, wherein the energy source comprises an amplifying circuit configured to amplify the input combined signal.

5. The control device according to claim 1, wherein the detector comprises at least one of an electric current sensor configured to detect an electric current value and an electric voltage sensor configured to detect an electric voltage value.

6. The control device according to claim 1, wherein the processor is configured to separate the detected signal into the plurality of frequency components by fast Fourier transform (FFT) analysis.

7. The control device according to claim 1, wherein, the processor is configured to:
when the scan is not performed, determine a frequency of the first frequency component as the resonance frequency, the first frequency component having the largest amplitude among the plurality of frequency components separated by the processor.

8. The control device according to claim 1, wherein the processor is configured to:
when an amplitude of the first frequency component is equal to or larger than a predetermined amplitude, determine not to perform the scan, and determine the frequency of the first frequency component as the resonance frequency,
when the amplitude of the first frequency component is less than the predetermined amplitude, determine to perform the scan, and sweep the frequency of the drive signal supplied to the ultrasound transducer over the sweep range to determine the resonance frequency,
wherein the second frequency component is immediately after the first frequency component, and
the third frequency component is immediately before the first frequency component.

9. The control device according to claim 1, wherein the processor is configured to:
when the scan is performed, determine a fourth frequency component as the resonance frequency, the fourth frequency component having a smallest phase difference between an electric voltage value and an electric current value thereof among the plurality of frequency components separated by the processor.

10. The control device according to claim 1, wherein the sweep range includes a fourth frequency component having a smallest phase difference between an electric voltage value and an electric current value thereof among the plurality of frequency separated,
the sweep range is between a fifth frequency component and a sixth frequency component,
the fifth frequency component is after the fourth frequency component, and
the sixth frequency component is before the fourth frequency component.

11. The control device according to claim 10, wherein the processor is configured to:
when a phase difference between the electric voltage value and the electric current value of the fourth frequency component is equal to or less than a predetermined phase difference, determine not to perform the scan, and determine the frequency of the fourth frequency component as the resonance frequency,
when the phase difference between the electric voltage value and the electric current value of the fourth frequency component is larger than the predetermined phase difference, determine to perform the scan, and sweep the frequency of the drive signal supplied to the ultrasound transducer over the sweep range to determine the resonance frequency,
wherein the fifth frequency component is immediately after the fourth frequency component, and
the sixth frequency component is immediately before the fourth frequency component.

12. An ultrasonic treatment system, comprising:
an ultrasound transducer configured to generate ultrasound vibration to treat a living tissue; and
the control device according to claim 1 wherein the control device is configured to control operation of the ultrasound transducer.

13. A resonance frequency searching method, comprising:
generating an input combined signal having a plurality of frequency components;
supplying the input combined signal to an ultrasound transducer;
detecting an output combined signal resulting from a change of the input combined signal;
outputting a detected signal according to the output combined signal;
separating the detected signal into a plurality of frequency components; and
determining, based on the plurality of frequency components, whether or not to perform a scan,
when the scan is performed, sweep a frequency of a drive signal supplied to the ultrasound transducer over a sweep range to determine a resonance frequency of the ultrasound transducer,
wherein the sweep range includes a first frequency component having a largest amplitude among the plurality of frequency components separated, the sweep range is between a second frequency component and a third frequency component, the second frequency component is after the first frequency component, and the third frequency component is before the first frequency component.

14. The resonance frequency searching method according to claim 13, wherein the generating, the supplying, the detecting, the outputting, the separating, the determining whether or not to perform a scan, and the determining of the resonance frequency of the ultrasound transducer are executed after an operation signal to start treatment of a living tissue has been received.

15. The resonance frequency searching method according to claim 13, wherein the generating, the supplying, the detecting, the outputting, the separating, the determining whether or not to perform a scan, and the determining of the resonance frequency of the ultrasound transducer are executed in a standby mode, the standby mode being a state: (i) that is before an operation signal to start treatment of a living tissue is received and (ii) in which electric power has been applied to an ultrasonic treatment system.

16. The control device according to claim 1, wherein:
the plurality of frequency components of the input combined signal have an identical amplitude,
the detected signal with the plurality of frequency components has different amplitudes for the plurality of frequency components, and
the processor is configured to, based on the first frequency component with the largest amplitude from among the plurality of frequency components, determine the resonance frequency of the ultrasound transducer.

17. The resonance frequency searching method according to claim 13, wherein:
the plurality of frequency components of the input combined signal have an identical amplitude,
the detected signal with the plurality of frequency components has different amplitudes for the plurality of frequency components, and
the determining comprises, based on the first frequency component with the largest amplitude from among the plurality of frequency components, determining the resonance frequency of the ultrasound transducer.

18. The control device according to claim 1, wherein:
the detector is configured to detect a frequency response of the ultrasound transducer; and
the processor is configured to, based on the plurality of frequency components in the frequency response, determine whether or not to perform a scan.

19. A control device, comprising:
an energy source configured to supply an input combined signal having a plurality of frequency components to an ultrasound transducer;
a detector configured to detect an output combined signal resulting from a change of the input combined signal by a frequency response of the ultrasound transducer, and output a detected signal according to the output combined signal; and
a processor configured to:
separate the detected signal into a plurality of frequency components,
based on the plurality of frequency components separated, determine whether or not to perform a scan,
when the scan is performed, sweep a frequency of a drive signal supplied to the ultrasound transducer over a sweep range to determine a resonance frequency of the ultrasound transducer, and
wherein the sweep range includes a first frequency component having a smallest phase difference between an electric voltage value and an electric current value thereof among the plurality of frequency separated, the sweep range is between a second frequency component and a third frequency component, the second frequency component is after the first frequency component, and the third frequency component is before the first frequency component.

20. A resonance frequency searching method, comprising:
generating an input combined signal having a plurality of frequency components;
supplying the input combined signal to an ultrasound transducer;
detecting an output combined signal resulting from a change of the input combined signal;
outputting a detected signal according to the output combined signal;
separating the detected signal into a plurality of frequency components; and
determining, based on the plurality of frequency components, whether or not to perform a scan,
when the scan is performed, sweep a frequency of a drive signal supplied to the ultrasound transducer over a sweep range to determine a resonance frequency of the ultrasound transducer, and
wherein the sweep range includes a first frequency component having a smallest phase difference between an electric voltage value and an electric current value thereof among the plurality of frequency separated, the sweep range is between a second frequency component and a third frequency component, the second frequency component is after the first frequency component, and the third frequency component is before the first frequency component.

* * * * *